US012610134B2

(12) United States Patent
Yang et al.

(10) Patent No.: US 12,610,134 B2
(45) Date of Patent: Apr. 21, 2026

(54) VIDEO CAPTURING METHOD, DEVICE, STORAGE MEDIUM AND PROGRAM PRODUCT

(71) Applicant: Beijing Zitiao Network Technology Co., Ltd., Beijing (CN)

(72) Inventors: Panyi Yang, Beijing (CN); Zhili Lin, Beijing (CN); Zheng Hao, Beijing (CN); Zhaofeng Liu, Beijing (CN); Defeng Zheng, Beijing (CN); Dapeng Wang, Beijing (CN); Dan Zhang, Beijing (CN); Huiying Wu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 145 days.

(21) Appl. No.: 18/570,426

(22) PCT Filed: Sep. 13, 2022

(86) PCT No.: PCT/CN2022/118529
§ 371 (c)(1),
(2) Date: Dec. 14, 2023

(87) PCT Pub. No.: WO2023/071569
PCT Pub. Date: May 4, 2023

(65) Prior Publication Data
US 2024/0284034 A1 Aug. 22, 2024

(30) Foreign Application Priority Data
Oct. 29, 2021 (CN) .......................... 202111276333.3

(51) Int. Cl.
H04N 23/63 (2023.01)
G06F 3/04817 (2022.01)
(Continued)

(52) U.S. Cl.
CPC ....... H04N 23/632 (2023.01); G06F 3/04817 (2013.01); G06F 3/04847 (2013.01); H04N 23/667 (2023.01)

(58) Field of Classification Search
CPC .... H04N 23/632; H04N 23/667; H04N 23/62; H04N 23/631; H04N 23/64; H04N 23/66;
(Continued)

(56) References Cited

U.S. PATENT DOCUMENTS 9,858,969 B2 * 1/2018 Khan ................... G11B 27/031
11,496,668 B2 * 11/2022 Kimura .................. H04N 23/71
(Continued)

FOREIGN PATENT DOCUMENTS

CN       104469119 A       3/2015
CN       108965706 A       12/2018
(Continued)

OTHER PUBLICATIONS

ISA China National Intellectual Property Administration, International Search Report and Written Opinion Issued in Application No. PCT/CN2022/118529, Dec. 14, 2022, WIPO, 11 pages.
(Continued)

*Primary Examiner* — Ahmed A Berhan
(74) *Attorney, Agent, or Firm* — Alleman Hall LLP

(57) ABSTRACT

Embodiments of the present disclosure provide a video capturing method, a device, a storage medium, a computer program product and a computer program. The method comprises: when obtaining a target video by means of a segmented image-capturing mode, in response to an image-capture pause operation, controlling image-capturing to pause and obtaining at least one image-captured video segment corresponding to the target video, and displaying, in an image-capture interface, at least one video segment identification corresponding to the at least one image-cap-
(Continued)

tured video segment; and in response to a triggering operation on any one video segment identification among the at least one video segment identification, displaying a preview interface, and playing back, in the preview interface, an image-captured video segment corresponding to the any one video segment identification.

17 Claims, 6 Drawing Sheets

(51) Int. Cl.
*G06F 3/04845* (2022.01)
*G06F 3/04847* (2022.01)
*H04N 23/667* (2023.01)

(58) Field of Classification Search
CPC ............. G06F 3/04817; G06F 3/04847; G06F 3/0482; G06F 3/04845; G06F 3/04883
See application file for complete search history.

(56) References Cited

U.S. PATENT DOCUMENTS

| | | | | |
|---|---|---|---|---|
| 2020/0412952 | A1* | 12/2020 | Hao | ....................... H04N 23/61 |
| 2021/0004131 | A1 | 1/2021 | Varshney et al. | |

FOREIGN PATENT DOCUMENTS

| | | | |
|---|---|---|---|
| CN | 109451245 | A | 3/2019 |
| CN | 110740246 | A | 1/2020 |
| CN | 111031404 | A | 4/2020 |
| CN | 111464735 | A | 7/2020 |
| CN | 112135059 | A | 12/2020 |
| CN | 114025087 | A | 2/2022 |
| WO | 2019057198 | A1 | 3/2019 |
| WO | 2020015334 | A1 | 1/2020 |

OTHER PUBLICATIONS

China National Intellectual Property Administration, Office Action and Search Report Issued in Application No. 202111276333.3, Mar. 14, 2023, 10 pages.

* cited by examiner

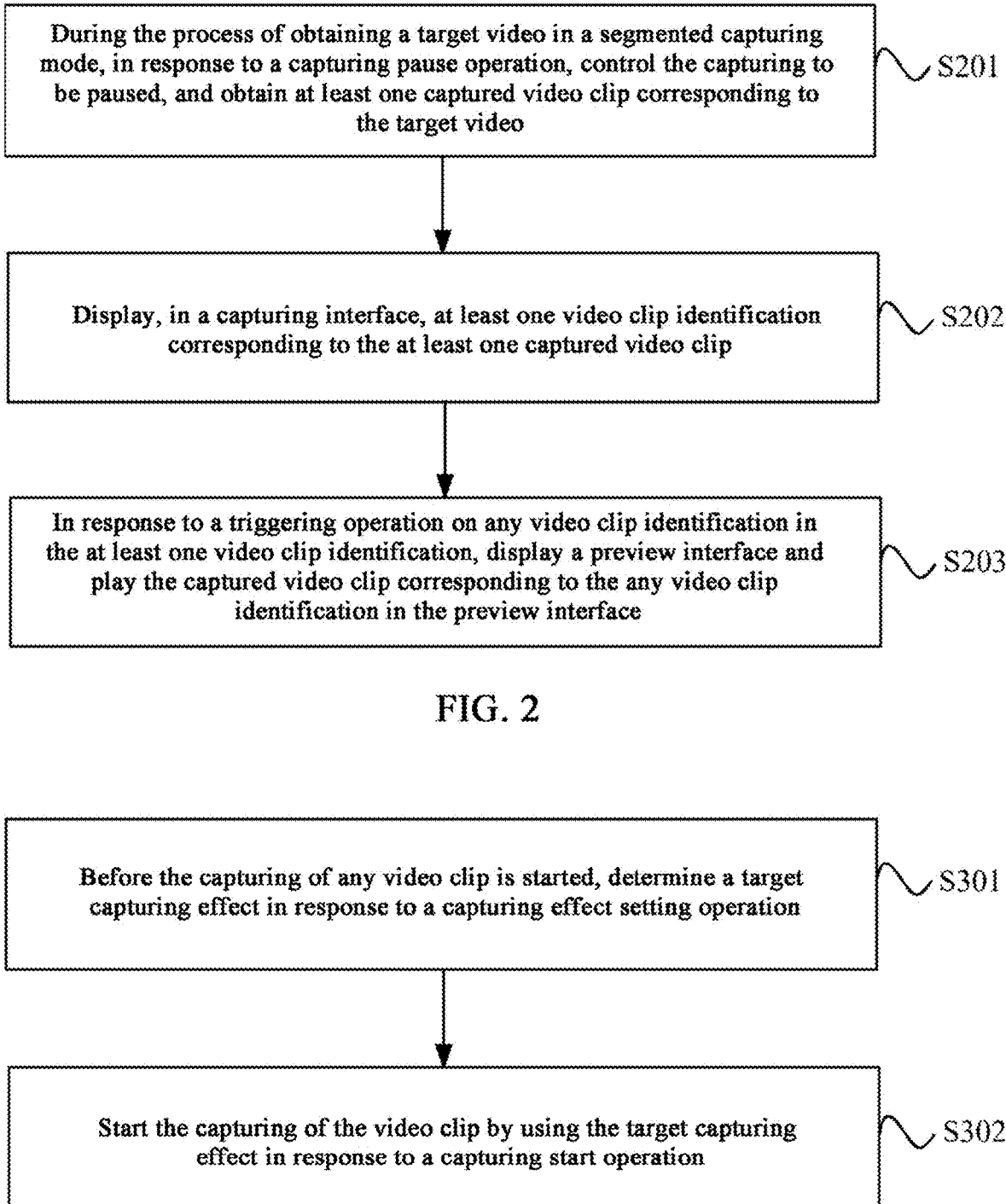

During the process of obtaining a target video in a segmented capturing mode, in response to a capturing pause operation, control the capturing to be paused, and obtain at least one captured video clip corresponding to the target video ⟶ S201

Display, in a capturing interface, at least one video clip identification corresponding to the at least one captured video clip ⟶ S202

In response to a triggering operation on any video clip identification in the at least one video clip identification, display a preview interface and play the captured video clip corresponding to the any video clip identification in the preview interface ⟶ S203

FIG. 2

Before the capturing of any video clip is started, determine a target capturing effect in response to a capturing effect setting operation ⟶ S301

Start the capturing of the video clip by using the target capturing effect in response to a capturing start operation ⟶ S302

FIG. 3

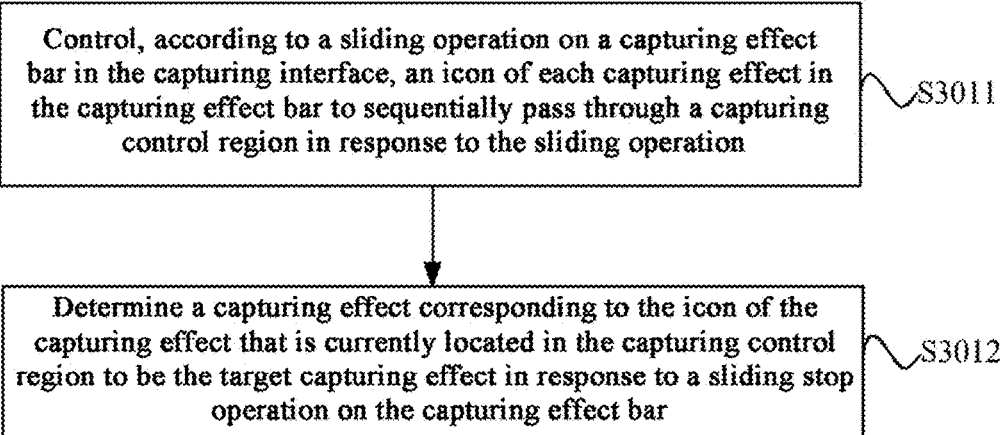

Control, according to a sliding operation on a capturing effect bar in the capturing interface, an icon of each capturing effect in the capturing effect bar to sequentially pass through a capturing control region in response to the sliding operation — S3011

Determine a capturing effect corresponding to the icon of the capturing effect that is currently located in the capturing control region to be the target capturing effect in response to a sliding stop operation on the capturing effect bar — S3012

FIG. 4

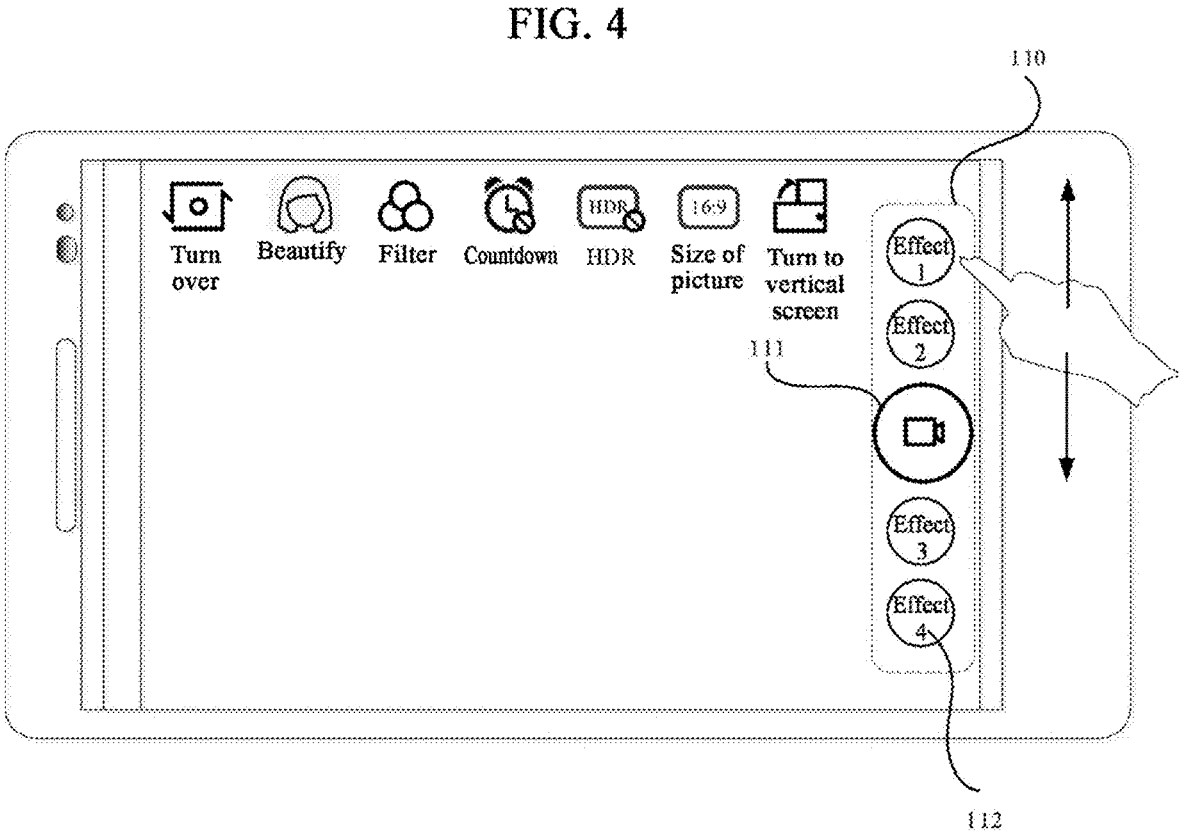

FIG. 5a

VIDEO CAPTURING METHOD, DEVICE, STORAGE MEDIUM AND PROGRAM PRODUCT

CROSS-REFERENCE TO RELATED APPLICATION(S)

This application is a U.S. National Stage Application of PCT Application Serial No. PCT/CN2022/118529, filed Sep. 13, 2022, claims priority to Chinese Application No. 202111276333.3, filed in the China Patent Office on Oct. 29, 2021, and entitled "Video Capturing Method, Device, Storage Medium and Program Product", the disclosures of which are incorporated herein by reference in their entireties.

FIELD

Embodiments of the present disclosure relate to the technical field of video processing, and in particular, to a video capturing method and device, a storage medium, a computer program product and a computer program.

BACKGROUND

At present, video capturing products on the market may support capturing of a segment of video or segmented capturing of a video, and the segmented capturing refers to capturing a plurality of video clips in a segmented mode during a capturing process, and finally obtaining a segment of complete video including the plurality of video clips.

SUMMARY

Embodiments of the present disclosure provide a video capturing method and device, a storage medium, a computer program product and a computer program.

In a first aspect, an embodiment of the present disclosure provides a video capturing method, including:

during the process of obtaining a target video in a segmented capturing mode, in response to a capturing pause operation, controlling the capturing to be paused, and obtaining at least one captured video clip corresponding to the target video;

displaying, in a capturing interface, at least one video clip identification corresponding to the at least one captured video clip; and in response to a triggering operation on any video clip identification in the at least one video clip identification, displaying a preview interface and playing the captured video clip corresponding to the any video clip identification in the preview interface.

In a second aspect, an embodiment of the present disclosure provides a video capturing device, including:

a capturing unit, used for: during the process of obtaining a target video in a segmented capturing mode, in response to a capturing pause operation, controlling the capturing to be paused, and obtaining at least one captured video clip corresponding to the target video;

a display unit, used for: displaying, in a capturing interface, at least one video clip identification corresponding to the at least one captured video clip; and a preview unit, used for: in response to a triggering operation on any video clip identification in the at least one video clip identification, displaying a preview interface and playing the captured video clip corresponding to the any video clip identification in the preview interface.

In a third aspect, an embodiment of the present disclosure provides an electronic device, including: at least one processor and a memory;

the memory stores a computer executable instruction; and the at least one processor executes the computer executable instruction stored in the memory, so that the at least one processor executes the video capturing method in the first aspect and various possible designs of the first aspect.

In a fourth aspect, an embodiment of the present disclosure provides a computer-readable storage medium, wherein a computer executable instruction is stored in the computer-readable storage medium, and when executing the computer executable instruction, a processor implements the video capturing method in the first aspect and various possible designs of the first aspect.

In a fifth aspect, an embodiment of the present disclosure provides a computer program product, including a computer executable instruction, wherein when executing the computer executable instruction, a processor implements the video capturing method in the first aspect and various possible designs of the first aspect.

In a sixth aspect, an embodiment of the present disclosure provides a computer program, including a computer executable instruction, and when executing the computer executable instruction, a processor implements the video capturing method in the first aspect and various possible designs of the first aspect.

According to the video capturing method and device, the storage medium, the computer program product and the computer program provided in the embodiments of the present disclosure, during the process of obtaining the target video in the segmented capturing mode, in response to the capturing pause operation, the capturing is controlled to be paused, and at least one captured video clip corresponding to the target video is obtained; at least one video clip identification corresponding to the at least one captured video clip is displayed in the capturing interface; and in response to the triggering operation on any video clip identification in the at least one video clip identification, the preview interface is displayed, and the captured video clip corresponding to the any video clip identification is displayed in the preview interface.

BRIEF DESCRIPTION OF THE DRAWINGS

To illustrate technical solutions in the embodiments of the present disclosure or in the prior art more clearly, a brief introduction on the drawings which are needed in the description of the embodiments or the prior art is given below. Apparently, the drawings in the description below are merely some of the embodiments of the present disclosure, based on which other drawings may be obtained by those ordinary skilled in the art without any creative effort.

FIG. 2 is a schematic flowchart of a video capturing method provided in an embodiment of the present disclosure;

FIG. 3 is a schematic flowchart of a video capturing method provided in another embodiment of the present disclosure;

FIG. 4 is a schematic flowchart of a video capturing method provided in another embodiment of the present disclosure;

FIG. 5*a* is a schematic diagram of a slide capturing effect bar provided in an embodiment of the present disclosure;

DETAILED DESCRIPTION OF EMBODIMENTS

In order to make the objectives, technical solutions and advantages of the embodiments of the present disclosure clearer, a clear and complete description of the technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those ordinary skilled in the art based on the embodiments in the present disclosure without any creative effort, fall into the protection scope of the present disclosure.

In an existing segmented capturing process, a user needs to complete capturing all video clips at a time, and performs browsing, editing and other operations on a complete video after obtaining the complete video by capturing all video clips, that is, at this time, the user may judge whether each video clip meets the expectation, and if not, the user captures the video clip again, such that the efficiency is relatively low. The existing segmented capturing process is not flexible enough and lower in efficiency, if it is determined whether re-capturing is required after the complete video is obtained, it is possible to miss the optimal time efficiency for capturing, for example, the user has not been at the same position, the same scenario cannot be captured again, or the content to be captured does not exist, such that the re-capturing cannot be performed.

In order to solve the above technical problems, an embodiment of the present disclosure provides a video capturing method, in which a captured video clip may be previewed in a segmented video capturing mode, so that the user can judge whether the captured video clip meets the capturing expectation, if so, the user may continue the capturing, and if not, the user may delete the captured video clip and perform re-capturing.

Figure 1A:
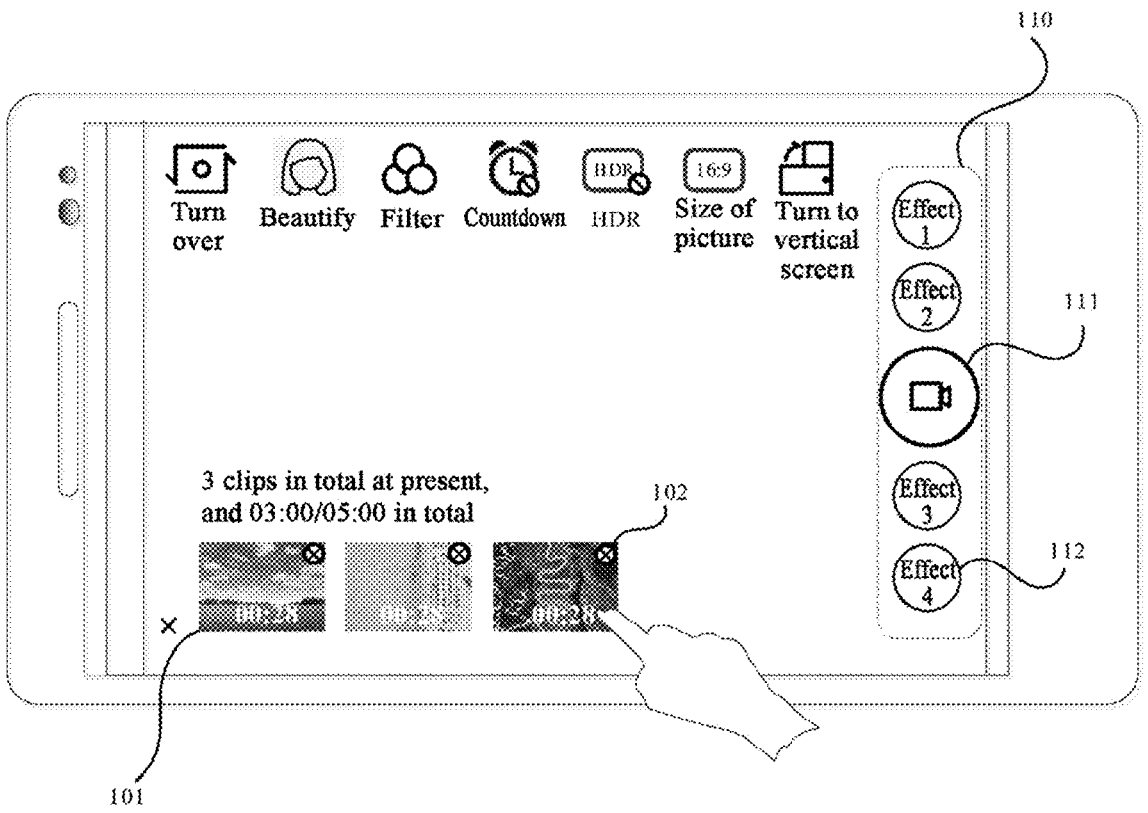
FIG. 1*a* is an example diagram of displaying a video clip identification on a capturing interface provided in an embodiment of the present disclosure.
Figure 1B:
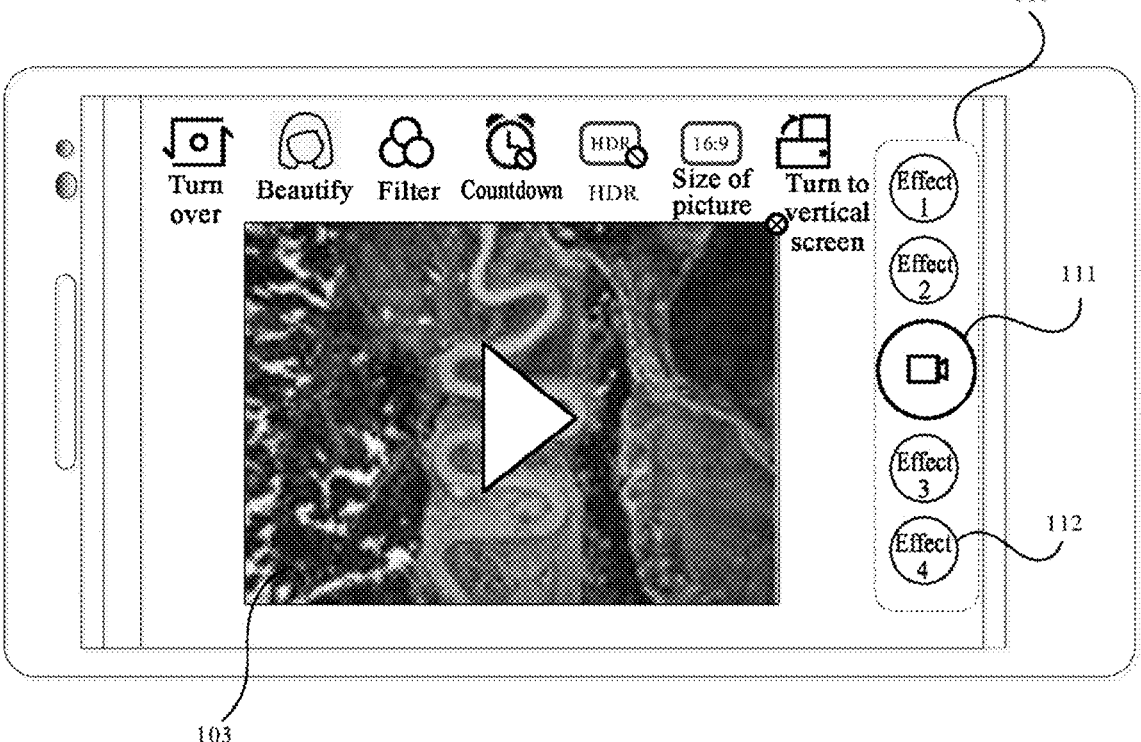
FIG. 1*b* is an example diagram of playing a captured video clip on a preview interface provided in an embodiment of the present disclosure.

Specifically, during the process of obtaining a target video in a segmented capturing mode, in response to a capturing pause operation, the capturing is controlled to be paused, and at least one captured video clip corresponding to the target video is obtained; as shown in FIG. 1*a*, at least one video clip identification 101 corresponding to the at least one captured video clip is displayed a capturing interface; in response to a click operation on the video clip identification corresponding to any video clip, a preview interface is displayed, wherein the preview interface is a preview interface 103 shown in FIG. 1*b*, and the captured video clip is displayed in the preview interface, so that the user judges whether the captured video clip meets the capturing expectation.

A clear and complete description of the technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those ordinary skilled in the art based on the embodiments in the present disclosure without any creative effort, fall into the protection scope of the present disclosure.

The method and apparatus are based on the same concept, and the implementation of the apparatus and method may refer to each other due to similar principles of the method and apparatus for solving the problems, and thus details are not described herein again.

Referring to FIG. 2, FIG. 2 is a schematic flowchart of a video capturing method provided in an embodiment of the present disclosure. The method in the present embodiment may be applied to a terminal device or a server, and the video capturing method includes:

S201: during the process of obtaining a target video in a segmented capturing mode, in response to a capturing pause operation, controlling the capturing to be paused, and obtaining at least one captured video clip corresponding to the target video.

In the present embodiment, the segmented video capturing mode refers to capturing a plurality of video clips in a segmented mode during a capturing process, and finally obtaining a segment of complete video including the plurality of video clips. During the process of performing segmented video capturing on the target video, every time when the user performs the capturing pause operation (e.g., clicking a capturing pause button in a capturing interface, the capturing process may be controlled to be paused and a segment of video clip is generated, that is, after the previous capturing pause operation, if the user performs a capturing continue operation (e.g., clicking a capturing continue button in the capturing interface), a segment of video clip is generated according to a video captured by a device from the moment of the capturing continue operation to the moment of the present capturing pause operation.

S202: displaying, in the capturing interface, at least one video clip identification corresponding to the at least one captured video clip.

In the present embodiment, after the capturing process is controlled to be paused, at least one video clip identification corresponding to the currently generated captured video clip and various captured video clips generated prior to the present capturing may be displayed in the capturing interface, that is, optionally, all video clip identifications may be displayed, or only the currently generated video clip identification may be displayed, or the currently generated video clip identification and a preset number of video clip identifications generated prior to the present capturing may be displayed, and so on, and examples are not listed herein one by one.

The video clip identification may be a first frame or a last frame of picture of the segment of video clip, or, may also be any frame of picture of the video clip, for example, a certain key frame picture therein, or, may also be an icon generated by the device, for example, an icon generated according to at least one piece of information such as a capturing location, a capturing time, the order of the video clip, and the like.

Optionally, information such as the duration of the video clip and the capturing location may also be added into the video clip identification.

S203: in response to a triggering operation on any video clip identification in the at least one video clip identification, displaying a preview interface, and playing the captured video clip corresponding to the any video clip identification in the preview interface.

In the present embodiment, after the at least one video clip identification is displayed in the capturing interface, the user may click any video clip identification, and may play the corresponding captured video clip in the preview interface for preview, and the user may judge, by means of preview, whether the captured video clip meets the capturing expectation.

Optionally, in the case that the capturing expectation is met, the user may continue the capturing, for example, click the capturing continue button in the capturing interface to capture the next segment of video clip; or, the user may also terminate the capturing, and splice the captured video clips to synthesize a segment of video.

Optionally, in the case that the capturing expectation is not met, the user may also delete the captured video clip that does not meet the capturing expectation. Specifically, in the present embodiment, after displaying, in the capturing interface, at least one video clip identification corresponding to the at least one captured video clip, the method further includes: in response to a deleting operation on the any video clip identification, deleting the captured video clip corresponding to the any video clip identification.

Optionally, based on any one of the above embodiments, the user may further adjust the order of the captured video clips, that is, in response to a sorting operation on the captured video clips, the order of the captured video clips is exchanged, wherein the sorting operation on the captured video clips may be sorting by means of dragging the video clip identifications.

According to the video capturing method provided in the present embodiment, during the process of obtaining the target video in the segmented capturing mode, in response to the capturing pause operation, the capturing is controlled to be paused, and at least one captured video clip corresponding to the target video is obtained; at least one video clip identification corresponding to the at least one captured video clip is displayed in the capturing interface; and in response to the triggering operation on any video clip identification in the at least one video clip identification, the preview interface is displayed, and the captured video clip corresponding to the any video clip identification is displayed in the preview interface. In the present embodiment, the captured video clip may be previewed in time in the segmented video capturing mode, so that the user can judge whether the captured video clip meets the capturing expectation in time, and thus the quality of segmented video capturing is ensured.

Based on the above embodiments, as shown in FIG. 3, the method may further include:

S301: before the capturing of any video clip is started, determining a target capturing effect in response to a capturing effect setting operation; and S302: in response to a capturing start operation, starting the capturing of the video clip by using the target capturing effect.

In the present embodiment, the capturing effect may be a filter, a beautifying function, or a prop function, and the like, wherein the prop function may include adding different pendants, photo frames, animations or special effects into the captured picture. In the present embodiment, with regard to the capturing of each segmented video in the segmented video capturing mode, a unified capturing effect may be utilized, different capturing effects may also be utilized respectively, the capturing effect may be set before the capturing of any video clip is started, particularly, after the capturing process is controlled to be paused, before the capturing of the next video clip is continued, the target capturing effect of the next video clip may be set, and then when the capturing is continued, the capturing of the next video clip is started by using the target capturing effect.

Optionally, based on the above embodiments, the device may provide a plurality of alternative capturing effects, and the user may select the target capturing effect.

As an optional embodiment, as shown in FIG. 4, the S301: determining the target capturing effect in response to the capturing effect setting operation may specifically include:

S3011: in response to a sliding operation on a capturing effect bar in the capturing interface, controlling, according to the sliding operation, an icon of each capturing effect in the capturing effect bar to sequentially pass through a capturing control region; and S3012: in response to a sliding stop operation on the capturing effect bar, determining, to be the target capturing effect, a capturing effect corresponding to the icon of the capturing effect that is currently located in the capturing control region.

Figure 5B:
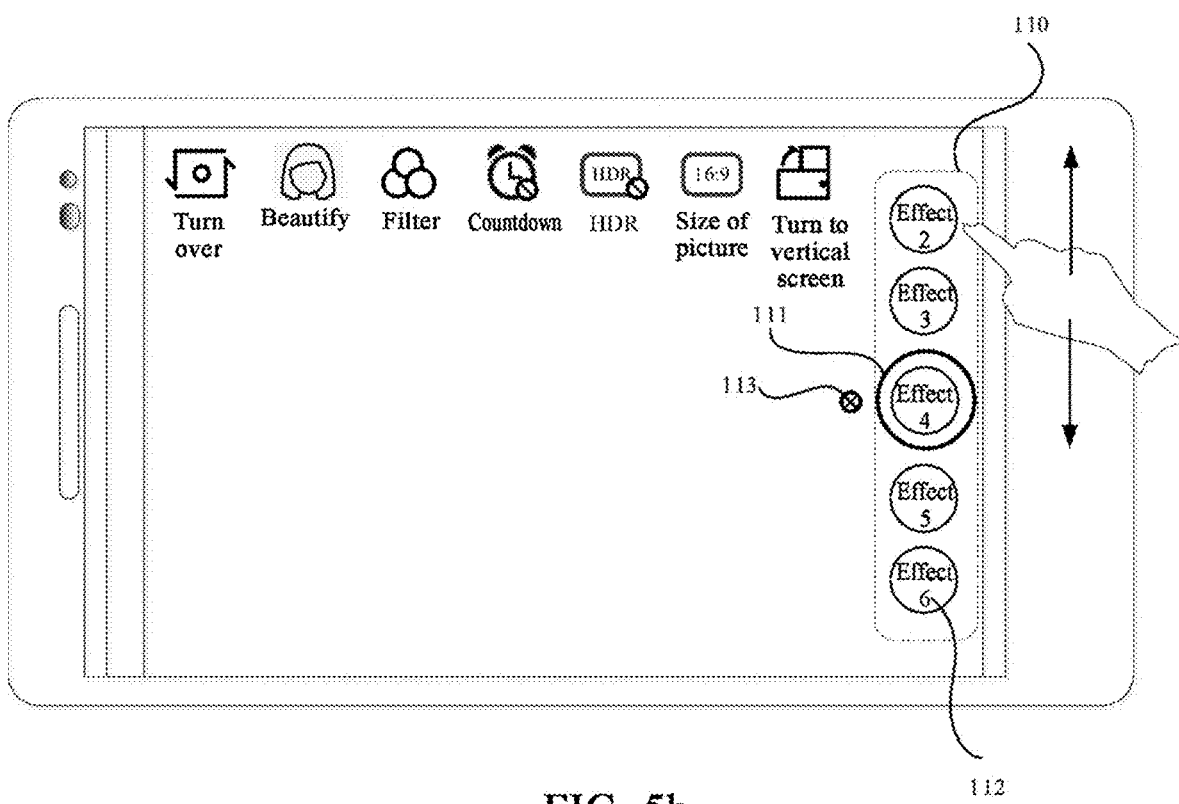
FIG. 5*b* is a schematic diagram of determining a target capturing effect provided in an embodiment of the present disclosure.

In the present embodiment, as shown in FIG. 5a, a capturing effect bar 110 is disposed in the capturing interface, icons 112 of a row of capturing effects may be displayed in the capturing effect bar 110, and are in the same row as a capturing control 111. Optionally, as shown in FIG. 5a, the capturing control 111 is located at the middle position of the capturing effect bar 110, and the capturing effect bar 110 is slidable, for example, the capturing control member 111 may slide up and down along the capturing effect bar 110 in FIG. 5a, so that the icon 112 of each capturing effect can sequentially pass through the region of the capturing control 111; when the capturing effect bar 110 stops sliding, the icon of a certain capturing effect is located in the region of the capturing control 111 (the region of the capturing control 111 is a region where the capturing control 111 is located), then the capturing effect corresponding to the icon of the capturing effect is determined to be the target capturing effect, for example, the icon of an effect 4 in FIG. 5b moves into the region of the capturing control 111, and then the capturing control 111 is clicked, so that the capturing of a new video clip can be started by using the target capturing effect.

Based on the above embodiments, considering that ordinary capturing is usually used as a capturing effect, the icon thereof is listed in the capturing effect bar, for example, the ordinary capturing is usually disposed at a first position of the capturing effect bar, therefore when the target capturing effect needs to be turned off to perform ordinary capturing, a capturing status bar needs to be slide to the ordinary capturing, especially when there are a lot of capturing effects, it takes a long time for the user to slide to the ordinary capturing, and the icon of the ordinary capturing cannot be easily discovered, thereby being inconvenient for the operation of the user. In order to solve the above technical problems, in the present embodiment, after the S3012: determining, to be the target capturing effect, the capturing effect corresponding to the icon of the capturing effect that is currently located in the capturing control region, the method further includes:

displaying a capturing effect closing button at a preset position around the capturing control, wherein the capturing effect closing button is used for closing the target capturing effect.

In the present embodiment, as shown in FIG. 5b, after the slide of the capturing effect bar 110 is stopped, the iron of the target capturing effect is located in the region of the capturing control 111, at this time, a capturing effect closing button 113 may be displayed at a preset position around the capturing control 111, and the capturing effect closing button 113 is used for closing the target capturing effect, wherein the preset position around the capturing control 111 may be the left side, right side, upper side or lower side of the capturing control 111, or other adjacent positions, so that the user can close the target capturing effect conveniently if necessary, and thus the operation of switching to the ordinary capturing is more convenient.

Further, after displaying the capturing effect closing button at the preset position around the capturing control, the method further includes:

in response to a triggering operation on the capturing effect closing button, closing the target capturing effect, and moving, out of the capturing control region, the icon of the capturing effect that is currently located in the capturing control region, so as to cancel the display of the capturing effect closing button.

Figure 5C:
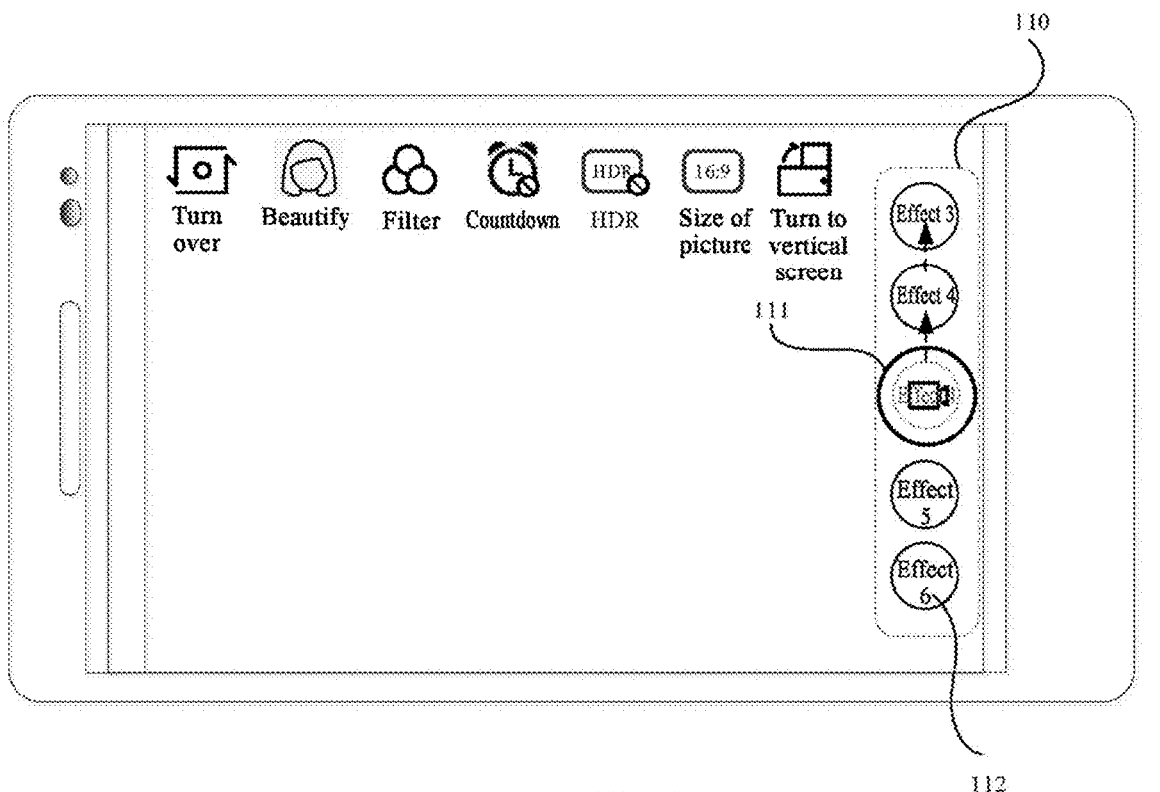
FIG. 5*c* is a schematic diagram of turning off a target capturing effect provided in an embodiment of the present disclosure.

In the present embodiment, after the user triggers the capturing effect closing button, the target capturing effect may be closed to switch to the ordinary capturing, at this time, the icon of the target capturing effect may be moved out of the capturing control region, meanwhile, the display of the capturing effect closing button is canceled, at this time, if the user clicks the capturing control again, the capturing of a new video clip is started in the ordinary capturing mode. Optionally, the icon of the target capturing effect is moved out of the capturing control region, as shown in FIG. 5c, the target capturing effect is moved forward by one position, the icons of the capturing effects before the icon of the target capturing effect are moved forward by one position in sequence, and the icons of subsequent capturing effects remain stationary; and of course, similarly, the target capturing effect may also be moved backwards by one position, the icons of the capturing effects after the icon of the target capturing effect are moved backwards by one position in sequence, and the icons of the front capturing effects remain stationary.

Based on the above embodiments, considering that the capturing requirements of some application programs are medium or long videos, wherein a medium video is relative to a short video and generally has a duration of 1-30 minutes, a long video is a video with a longer duration and is generally captured by a rear camera, the medium video or the long video is generally a horizontal video, that is, a width-to-height ratio is greater than 1, some application programs in the related art will provide an up and down clipping mode, the user vertically holds a device such as a mobile phone for capturing, and then clips the captured video up and down to form a horizontal video with a width-to-height ratio greater than 1, but when the user vertically holds the device such as the mobile phone for capturing, the view finding range is relatively small. In order to solve the above technical problems, in the present embodiment, the user may be guided to horizontally hold the device such as the mobile phone via a page layout for capturing. Specifically, before the capturing process, the method further includes:

in response to a triggering operation on a capturing entry, displaying the capturing interface, wherein at least one capturing association identification is displayed in the capturing interface, and the at least one capturing association identification is horizontally arranged on the capturing interface, so as to guide the user to switch to a horizontal-screen capturing mode.

The capturing association identification may be a function identification related to capturing and having an auxiliary capturing function, such as a beautifying function identification, a filter function identification and a countdown function identification, and the function identification may include an icon identification and/or a text identification.

Figure 6A:
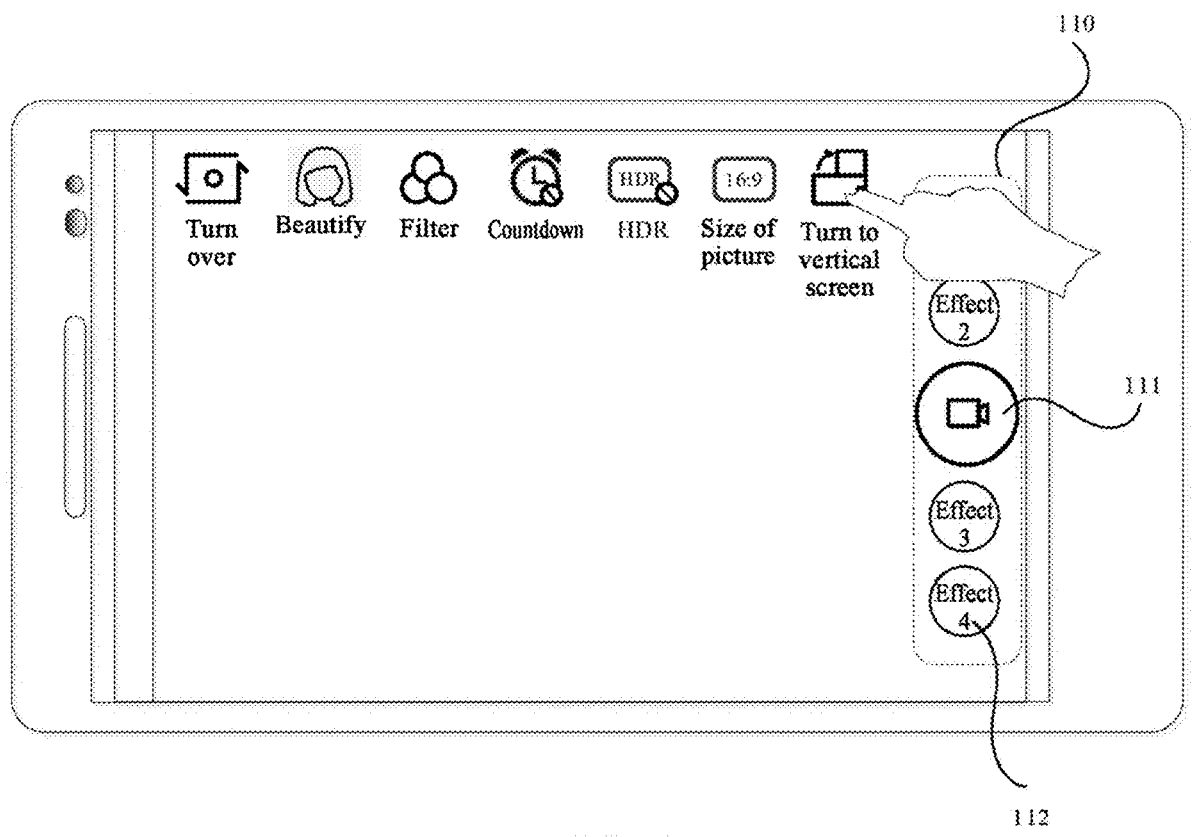
FIG. 6*a* is a schematic diagram of triggering an interface layout switching operation provided in an embodiment of the present disclosure.

In the present embodiment, in some application programs where medium or long videos need to be captured, or in a case that medium or long videos need to be captured in some application programs, the user may trigger the capturing entry, for example, click a capturing start button, at this time, the capturing interface may be displayed, the capturing interface is displayed in a horizontal interface layout by default, wherein the at least one capturing association identification is horizontally arranged on the capturing interface, as shown in FIG. 6a, so that the user can be prompted to flip the terminal device to a horizontal direction, so as to perform capturing in the horizontal interface layout. Optionally, a prompt word for prompting the user to rotate the device may also be displayed, and the user is guided to horizontally hold the device such as the mobile phone for capturing.

The display direction of the icon or text corresponding to the function identification is horizontal (the display direction of a single text or a single icon is respectively horizontal), so as to guide the user to switch from holding the mobile phone in a vertical screen to holding the mobile phone in a horizontal screen, so as to perform horizontal-screen mode capturing, thereby facilitating the user to improve the capturing effect of a horizontal video and reducing black boxes.

Optionally, the capturing entry may include a capturing entry of the medium video or the long video and a capturing entry of the short video, and after the capturing entry of the medium video or the long video is triggered, the horizontal interface layout is displayed by default; and after the capturing entry of the short video is triggered, a vertical interface layout is displayed by default.

Based on the above embodiments, the method further includes:

in response to a triggering operation of switching the horizontal-screen capturing mode to a vertical-screen capturing mode, rotating the at least one capturing association identification by 90 degrees according to respective rotation centers, so as to enter the vertical-screen capturing mode.

Figure 6B:
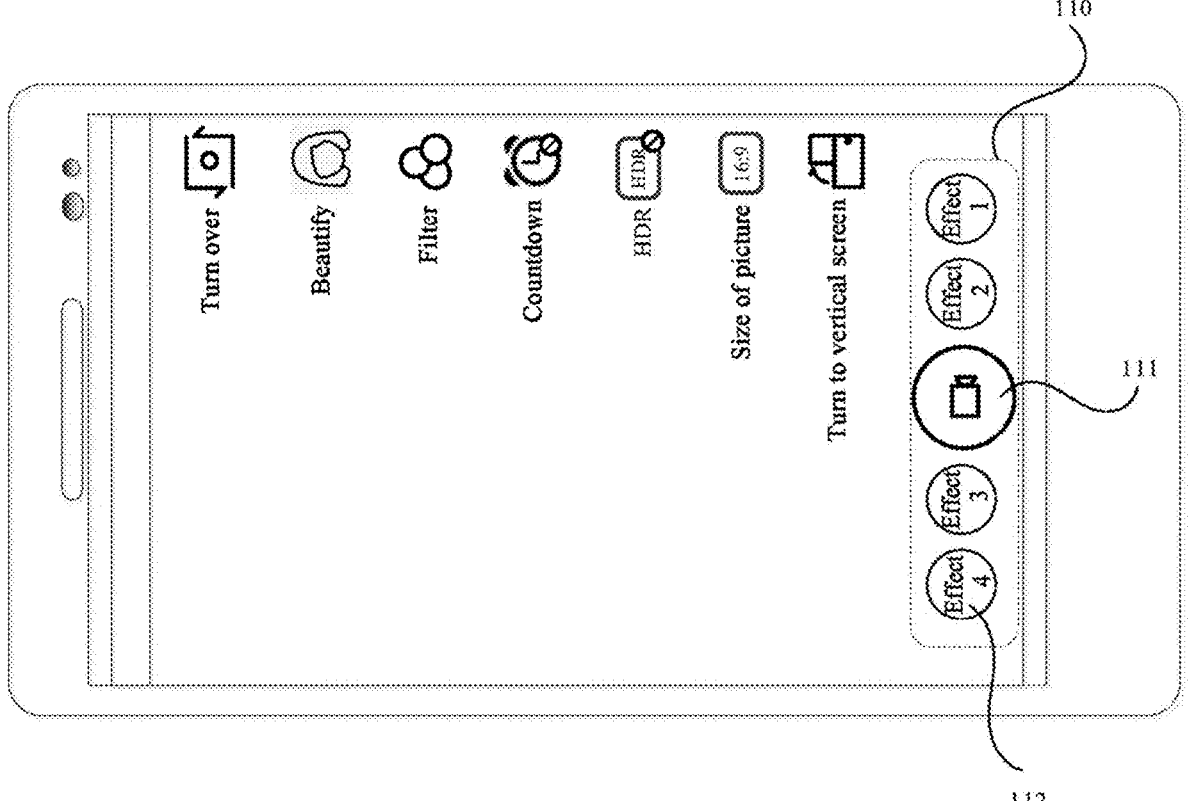
FIG. 6*b* is a schematic diagram of a switched vertical interface layout provided in an embodiment of the present disclosure.

In the present embodiment, in the capturing interface, mutual switching between the horizontal interface layout and the vertical interface layout may be performed, for example, if it is currently in the horizontal interface layout, the user may switch the horizontal interface layout to the vertical interface layout by means of triggering an interface layout switching operation, or, if it is currently in the vertical interface layout, the user may switch the vertical interface layout to the horizontal interface layout by means of triggering the interface layout switching operation. During the mutual switching between the horizontal interface layout and the vertical interface layout, the positions of elements such as icons and texts in the capturing interface remain unchanged, and only need to be rotated by 90 degrees towards a predetermined direction according to respective rotation centers, the predetermined direction may be based on a positive direction of elements such as icons and texts when the mobile phone is held vertically, as shown in FIG. 6a, the user may click a vertical screen handover button in the vertical interface layout, the positions of elements such as icons and texts in the capturing interface remain unchanged, and only need to be rotated by 90 degrees towards the predetermined direction according to respective rotation centers, as shown in FIG. 6b, and then the user may rotate the mobile phone to perform vertical-screen capturing. By means of displaying a horizontal-screen and vertical-screen handover button on the video capturing interface, the user can conveniently switch the horizontal-screen and vertical-screen capturing modes, such that the operation paths are reduced, different capturing mode requirements of the user can be better met, and the user experience is improved.

Based on any one of the above embodiments, the method further includes:

in response to a start operation of a sight line correcting function, running a preset sight line correction algorithm during the capturing process, so as to correct the direction of the sight line in the captured video.

In the present embodiment, when the user performs selfie or photograph a person, the direction of the sight line of the captured person may be abnormal, for example, in the horizontal-screen capturing mode, when the user performs selfie, when the user looks at the camera for selfie, the user cannot see the screen, and when the user looks at the screen for selfie, a skew-eyed problem may occur. In order to solve the above technical problems, in the present embodiment, the sight line correcting function is provided, the user may control the sight line correcting function to be turned on in a scenario requiring sight line correction, specifically, the user may click a sight line correcting function button to pop up a functional panel in the interface, so as to control the sight line correcting function button to be turned on or turned off, and after the function is turned on, the preset sight line correction algorithm may be run during the capturing process, so as to correct the direction of the sight line in the captured video, so that the direction of the sight line is more natural, and the skew-eyed problem does not occur, wherein the preset sight line correction algorithm may be an artificial intelligence algorithm or other algorithms, and details are not described herein again.

Based on any one of the above embodiments, the capturing interface may further include a switch button of anti-shake and HDR (High-Dynamic Range), and a turn-on or turn-off operation may be performed after the switch button is clicked.

Based on any one of the above embodiments, the capturing interface may further include buttons of Beautify, filter, countdown and Size of picture handover, after the button is clicked, a panel is unfolded, for example, unfolded from the bottom of the capturing interface, after the panel is unfolded, other buttons and segmentation information disappear, and only a viewfinder is reserved; and if a region outside the panel is clicked, the panel disappears, or, a return key may also be provided, and the panel also disappears after a return operation. The button of Size of picture handover is only displayed in the horizontal interface layout, the vertical interface layout does not support Size of picture handover, when the user triggers Size of picture handover in the vertical interface layout, it may be prompted that "Size of picture handover is not supported in this mode".

Based on any one of the above embodiments, the capturing interface may further include a zoom button, a panel is unfolded after the zoom button is clicked, and the user may click the button for zooming (or the user may also scale the screen in two fingers for zooming); the capturing interface may further comprise a lens turn-over button, and after the lens turn-over button is clicked, front-rear lens handover is performed, and it is also supported to perform the front-rear lens handover by double clicking the screen.

Figure 7:
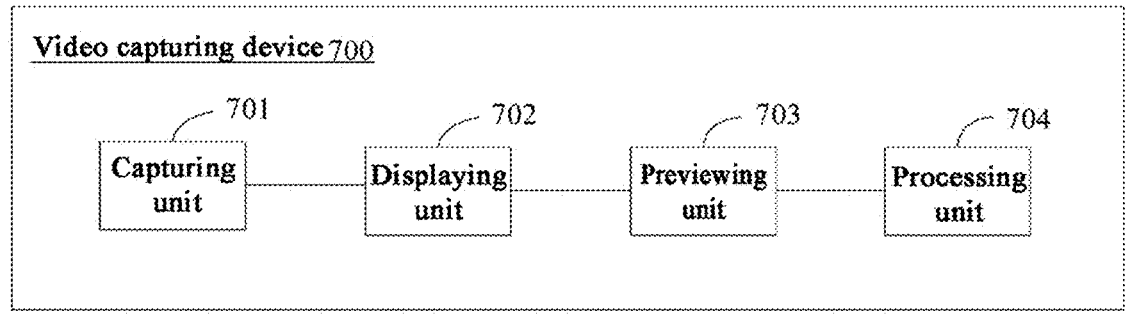
FIG. 7 is a structural block diagram of a video capturing device provided in an embodiment of the present disclosure.

Corresponding to the video capturing method in the above embodiments, FIG. 7 is a structural block diagram of a video capturing device provided in an embodiment of the present disclosure. For ease of description, only parts related to the embodiments of the present disclosure are shown. Referring to FIG. 7, the video capturing device 700 includes a capturing unit 701, a display unit 702, and a preview unit 703.

The capturing unit 701 is used for: during the process of obtaining a target video in a segmented capturing mode, in response to a capturing pause operation, controlling the capturing to be paused, and obtaining at least one captured video clip corresponding to the target video;

the display unit 702 is used for: displaying, in a capturing interface, at least one video clip identification corresponding to the at least one captured video clip; and the preview unit 703 is used for: in response to a triggering operation on any video clip identification in the at least one video clip identification, displaying a preview interface and playing the captured video clip corresponding to the any video clip identification in the preview interface.

In one or more embodiments of the present disclosure, the video capturing device further includes a processing unit 704, used for: in response to a deleting operation on the any video clip identification, deleting the captured video clip corresponding to the any video clip identification.

In one or more embodiments of the present disclosure, the capturing unit 701 is further used for:

before the capturing of any video clip is started, determining a target capturing effect in response to a capturing effect setting operation; and in response to a capturing start operation, starting the capturing of the video clip by using the target capturing effect.

In one or more embodiments of the present disclosure, when determining the target capturing effect in response to the capturing effect setting operation, the capturing unit 701 is used for:

in response to a sliding operation on a capturing effect bar in the capturing interface, controlling, according to the sliding operation, an icon of each capturing effect in the capturing effect bar to sequentially pass through a capturing control region; and in response to a sliding stop operation on the capturing effect bar, determining, to be the target capturing effect, a capturing effect corresponding to the icon of the capturing effect that is currently located in the capturing control region.

In one or more embodiments of the present disclosure, after the capturing unit 701 determines, to be the target capturing effect, the capturing effect corresponding to the icon of the capturing effect that is currently located in the capturing control region, the display unit 702 is further used for:

displaying a capturing effect closing button at a preset position around the capturing control, wherein the capturing effect closing button is used for closing the target capturing effect.

In one or more embodiments of the present disclosure, after the display unit 702 displays the capturing effect closing button at the preset position around the capturing control, the capturing unit 701 is further used for:

in response to a triggering operation on the capturing effect closing button, closing the target capturing effect; and the display unit 702 is further used for: moving, out of the capturing control region, the icon of the capturing effect that is currently located in the capturing control region, so as to cancel the display of the capturing effect closing button.

In one or more embodiments of the present disclosure, before the capturing process, the capturing unit 701 is further used for:

in response to a triggering operation on a capturing entry, displaying the capturing interface, wherein at least one capturing association identification is displayed in the capturing interface, and the at least one capturing association identification is horizontally arranged on the capturing interface, so as to guide the user to switch to a horizontal-screen capturing mode.

In one or more embodiments of the present disclosure, the display unit 702 is further used for:

in response to a triggering operation of switching the horizontal-screen capturing mode to a vertical-screen capturing mode, rotating the at least one capturing association identification by 90 degrees according to respective rotation centers, so as to enter the vertical-screen capturing mode.

In one or more embodiments of the present disclosure, the processing unit 704 is further used for:

in response to a start operation of a sight line correcting function, running a preset sight line correction algorithm during the capturing process, so as to correct the direction of the sight line in the captured video.

The device provided in the present embodiment may be used for executing the technical solutions of the above method embodiments, and the implementation principles and technical effects thereof are similar, thus details are not described herein again.

Figure 8:
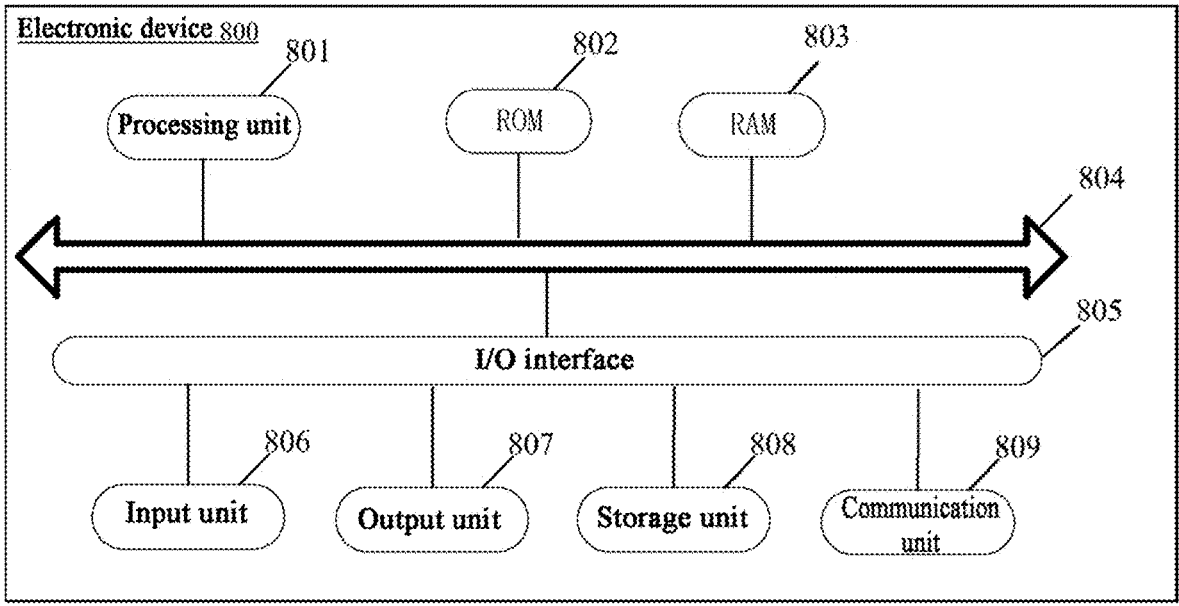
FIG. 8 is a schematic diagram of a hardware structure of an electronic device provided in an embodiment of the present disclosure.

Referring to FIG. 8, it illustrates a schematic structural diagram of an electronic device 800 suitable for implementing the embodiments of the present disclosure. The electronic device 800 may be a terminal device or a server. The terminal device may include, but is not limited to, mobile terminals such as mobile phones, notebook computers, digital broadcast receivers, personal digital assistants (PDAs for short), portable Android devices (PADs for short), portable media players (PMPs for short), vehicle-mounted terminals (e.g., vehicle-mounted navigation terminals), and the like, and fixed terminals such as digital TVs, desktop computers, and the like. The electronic device shown in FIG. 8 is merely an example, and should not bring any limitation to the functions and use ranges of the embodiments of the present disclosure.

As shown in FIG. 8, the electronic device 800 may include a processing unit (e.g., a central processing unit, a graphics processing unit, or the like) 801, which may perform various suitable actions and processes in accordance with a program stored in a read only memory (ROM for short) 802 or a program loaded from a storage unit 808 into a random access memory (RAM for short) 803. In the RAM 803, various programs and data needed by the operations of the electronic device 800 are also stored. The processing unit 801, the ROM 802 and the RAM 803 are connected to each other via a bus 804. An input/output (I/O for short) interface 805 is also connected to the bus 804.

In general, the following apparatuses may be connected to the I/O interface 805: an input unit 806, including, for example, a touch screen, a touch pad, a keyboard, a mouse, a camera, a microphone, an accelerometer, a gyroscope, and the like; an output unit 807, including, for example, a liquid crystal display (LCD for short), a speaker, a vibrator, and the like; a storage unit 808, including, for example, a magnetic tape, a hard disk, and the like; and a communication unit 809. The communication unit 809 may allow the electronic device 800 to communicate in a wireless or wired manner with other devices to exchange data. Although FIG. 8 illustrates the electronic device 800 having various apparatuses, it should be understood that not all illustrated apparatuses are required to be implemented or provided. More or fewer apparatuses may alternatively be implemented or provided.

In particular, according to the embodiments of the present disclosure, the processes described above with reference to the flowcharts may be implemented as computer software programs. For example, the embodiments of the present disclosure include a computer program product, which includes a computer program carried on a computer-readable medium, and the computer program contains program codes for performing the method illustrated in the flowcharts. In such embodiments, the computer program may be downloaded and installed from a network via the communication unit 809, or installed from the storage unit 808, or installed from the ROM 802. When the computer program is executed by the processing unit 801, the above functions defined in the method of the embodiments of the present disclosure are performed.

It should be noted that, the computer-readable medium described above in the present disclosure may be either a computer-readable signal medium or a computer-readable storage medium, or any combination of the two. The computer-readable storage medium may be, for example, but is not limited to, an electronic, magnetic, optical, electromagnetic, infrared, or semiconductor system, apparatus or device, or a combination of any of the above. More specific examples of the computer-readable storage medium may include, but are not limited to: an electrical connection having one or more wires, a portable computer magnetic disk, a hard disk, a random access memory (RAM), a read only memory (ROM), an erasable programmable read only memory (EPROM for short or flash memory), an optical fiber, a portable compact disc read only memory (CD-ROM for short), an optical storage device, a magnetic storage device, or any suitable combination of the above. In the present disclosure, the computer-readable storage medium may be any tangible medium that contains or stores a program, wherein the program may be used by or in conjunction with an instruction execution system, apparatus or device. In the present disclosure, the computer-readable signal medium may include a data signal that is propagated in a baseband or as part of a carrier, wherein the data signal carries computer-readable program codes. Such propagated data signal may take many forms, including, but not limited to, electromagnetic signals, optical signals, or any suitable combination thereof. The computer-readable signal medium may also be any computer-readable medium other than the computer-readable storage medium, and the computer-readable signal medium may send, propagate or transport the program for use by or in conjunction with the instruction execution system, apparatus or device. Program codes contained on the computer-readable medium may be transmitted with any suitable medium, including, but not limited to: an electrical wire, an optical cable, RF (radio frequency), and the like, or any suitable combination thereof.

The computer-readable medium may be contained in the above electronic device; and it may also be present separately and is not assembled into the electronic device.

The computer-readable medium carries one or more programs that, when executed by the electronic device, cause the electronic device to execute the method shown in the above embodiments.

Computer program codes for executing the operations of the present disclosure may be written in one or more programming languages or combinations thereof. The programming languages include object-oriented programming languages, such as Java, Smalltalk, C++, and conventional procedural programming languages, such as the "C" language or similar programming languages. The program codes may be executed entirely on a user computer, executed partly on the user computer, executed as a stand-alone software package, executed partly on the user computer and partly on a remote computer, or executed entirely on the remote computer or a server. In the case involving the remote computer, the remote computer may be connected to the user computer through any type of network, including a local area network (LAN for short) or a wide area network (WAN for short), or it may be connected to an external computer (e.g., through the Internet using an Internet service provider).

The flowcharts and block diagrams in the drawings illustrate the system architecture, functions and operations of possible implementations of systems, methods and computer program products according to various embodiments of the present disclosure. In this regard, each block in the flowcharts or block diagrams may represent a part of a module, a program segment, or a code, which contains one or more executable instructions for implementing specified logical functions. It should also be noted that, in some alternative implementations, the functions annotated in the block may occur out of the order annotated in the drawings. For example, two blocks shown in succession may, in fact, be executed substantially concurrently, or the blocks may sometimes be executed in a reverse order, depending upon the functions involved. It should also be noted that each block in the block diagrams and/or flowcharts, and combinations of the blocks in the block diagrams and/or flowcharts may be implemented by dedicated hardware-based systems for performing specified functions or operations, or combinations of dedicated hardware and computer instructions.

The units involved in the described embodiments of the present disclosure may be implemented in a software or hardware manner. The names of the units do not constitute limitations of the units themselves in a certain case. For example, a first acquisition unit may also be described as "a unit for acquiring at least two Internet Protocol addresses".

The functions described herein above may be performed, at least in part, by one or more hardware logic components. For example, without limitation, example types of the hardware logic components that may be used include: a field programmable gate array (FPGA for short), an application specific integrated circuit (ASIC for short), an application specific standard product (ASSP for short), a system on chip (SOC for short), a complex programmable logic device (CPLD for short), and so on.

In the context of the present disclosure, a machine-readable medium may be a tangible medium, which may contain or store a program for use by or in conjunction with the instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of the machine-readable storage medium would include an electrical connection based on one or more wires, a portable computer disk, a hard disk, a random access memory (RAM), a read-only memory (ROM), an erasable programmable read-only memory (EPROM or a flash memory), an optical fiber, a compact disc-read-only memory (CD-ROM), an optical storage device, a magnetic storage device, or any suitable combination thereof.

In a first aspect, according to one or more embodiments of the present disclosure, provided is a video capturing method, including:

during the process of obtaining a target video in a segmented capturing mode, in response to a capturing pause operation, controlling the capturing to be paused, and obtaining at least one captured video clip corresponding to the target video;

displaying, in a capturing interface, at least one video clip identification corresponding to the at least one captured video clip; and in response to a triggering operation on any video clip identification in the at least one video clip identification, displaying a preview interface and playing the captured video clip corresponding to the any video clip identification in the preview interface.

According to one or more embodiments of the present disclosure, the method further includes:

in response to a deleting operation on the any video clip identification, deleting the captured video clip corresponding to the any video clip identification.

According to one or more embodiments of the present disclosure, the method further includes:

before the capturing of any video clip is started, determining a target capturing effect in response to a capturing effect setting operation; and in response to a capturing start operation, starting the capturing of the video clip by using the target capturing effect.

According to one or more embodiments of the present disclosure, determining the target capturing effect in response to the capturing effect setting operation, includes:

in response to a sliding operation on a capturing effect bar in the capturing interface, controlling, according to the sliding operation, an icon of each capturing effect in the capturing effect bar to sequentially pass through a capturing control region; and in response to a sliding stop operation on the capturing effect bar, determining, to be the target capturing effect, a capturing effect corresponding to the icon of the capturing effect that is currently located in the capturing control region.

According to one or more embodiments of the present disclosure, after determining, to be the target capturing effect, the capturing effect corresponding to the icon of the capturing effect that is currently located in the capturing control region, the method further includes:

displaying a capturing effect closing button at a preset position around the capturing control, wherein the capturing effect closing button is used for closing the target capturing effect.

According to one or more embodiments of the present disclosure, after displaying the capturing effect closing button at the preset position around the capturing control, the method further includes:

in response to a triggering operation on the capturing effect closing button, closing the target capturing effect, and moving, out of the capturing control region, the icon of the capturing effect that is currently located in the capturing control region, so as to cancel the display of the capturing effect closing button.

According to one or more embodiments of the present disclosure, before the capturing process, the method further includes:

in response to a triggering operation on a capturing entry, displaying the capturing interface, wherein at least one capturing association identification is displayed in the capturing interface, and the at least one capturing association identification is horizontally arranged on the capturing interface, so as to guide the user to switch to a horizontal-screen capturing mode.

According to one or more embodiments of the present disclosure, the method further includes:

in response to a triggering operation of switching the horizontal-screen capturing mode to a vertical-screen capturing mode, rotating the at least one capturing association identification by 90 degrees according to respective rotation centers, so as to enter the vertical-screen capturing mode.

According to one or more embodiments of the present disclosure, the method further includes:

in response to a start operation of a sight line correcting function, running a preset sight line correction algorithm during the capturing process, so as to correct the direction of the sight line in the captured video.

In a second aspect, according to one or more embodiments of the present disclosure, provided is a video capturing device, including:

a capturing unit, used for: during the process of obtaining a target video in a segmented capturing mode, in response to a capturing pause operation, controlling the capturing to be paused, and obtaining at least one captured video clip corresponding to the target video;

a display unit, used for: displaying, in a capturing interface, at least one video clip identification corresponding to the at least one captured video clip; and a preview unit, used for: in response to a triggering operation on any video clip identification in the at least one video clip identification, displaying a preview interface and playing the captured video clip corresponding to the any video clip identification in the preview interface.

According to one or more embodiments of the present disclosure, the video capturing device further includes a processing unit, used for: in response to a deleting operation on the any video clip identification, deleting the captured video clip corresponding to the any video clip identification.

According to one or more embodiments of the present disclosure, the capturing unit is further used for:

before the capturing of any video clip is started, determining a target capturing effect in response to a capturing effect setting operation; and in response to a capturing start operation, starting the capturing of the video clip by using the target capturing effect.

According to one or more embodiments of the present disclosure, when determining the target capturing effect in response to the capturing effect setting operation, the capturing unit is used for:

in response to a sliding operation on a capturing effect bar in the capturing interface, controlling, according to the sliding operation, an icon of each capturing effect in the capturing effect bar to sequentially pass through a capturing control region; and in response to a sliding stop operation on the capturing effect bar, determining, to be the target capturing effect, a capturing effect corresponding to the icon of the capturing effect that is currently located in the capturing control region.

According to one or more embodiments of the present disclosure, after the capturing unit determines, to be the target capturing effect, the capturing effect corresponding to the icon of the capturing effect that is currently located in the capturing control region, the display unit is further used for:

displaying a capturing effect closing button at a preset position around the capturing control, wherein the capturing effect closing button is used for closing the target capturing effect.

According to one or more embodiments of the present disclosure, after the display unit displays the capturing effect closing button at the preset position around the capturing control, the capturing unit is further used for:

in response to a triggering operation on the capturing effect closing button, closing the target capturing effect; and the display unit is further used for: moving, out of the capturing control region, the icon of the capturing effect that is currently located in the capturing control region, so as to cancel the display of the capturing effect closing button.

According to one or more embodiments of the present disclosure, before the capturing process, the capturing unit is further used for:

in response to a triggering operation on a capturing entry, displaying the capturing interface, wherein at least one capturing association identification is displayed in the capturing interface, and the at least one capturing association identification is horizontally arranged on the capturing interface, so as to guide the user to switch to a horizontal-screen capturing mode.

According to one or more embodiments of the present disclosure, the display unit is further used for:

in response to a triggering operation of switching the horizontal-screen capturing mode to a vertical-screen capturing mode, rotating the at least one capturing association identification by 90 degrees according to respective rotation centers, so as to enter the vertical-screen capturing mode.

According to one or more embodiments of the present disclosure, the processing unit is further used for:

in response to a start operation of a sight line correcting function, running a preset sight line correction algorithm during the capturing process, so as to correct the direction of the sight line in the captured video.

In a third aspect, according to one or more embodiments of the present disclosure, provided is an electronic device, including: at least one processor and a memory;

the memory stores a computer executable instruction; and the at least one processor executes the computer execut-
able instruction stored in the memory, so that the at
least one processor executes the video capturing
method in the first aspect and various possible designs
of the first aspect.

In a fourth aspect, according to one or more embodiments
of the present disclosure, provided is a computer-readable
storage medium, wherein a computer executable instruction
is stored in the computer-readable storage medium, and
when executing the computer executable instruction, a pro-
cessor implements the video capturing method in the first
aspect and various possible designs of the first aspect.

In a fifth aspect, according to one or more embodiments
of the present disclosure, provided is a computer program
product, including a computer executable instruction,
wherein when executing the computer executable instruc-
tion, a processor implements the video capturing method in
the first aspect and various possible designs of the first
aspect.

In a sixth aspect, according to one or more embodiments
of the present disclosure, provided is a computer program,
including a computer executable instruction, and when
executing the computer executable instruction, a processor
implements the video capturing method in the first aspect
and various possible designs of the first aspect.

According to the video capturing method and device, the
storage medium, the computer program product and the
computer program provided in the embodiments of the
present disclosure, the problem of the captured video clip
being unable to be previewed during the segmented captur-
ing process can be solved. During the process of obtaining
the target video in the segmented capturing mode, in
response to the capturing pause operation, the capturing is
controlled to be paused, and at least one captured video clip
corresponding to the target video is obtained; at least one
video clip identification corresponding to the at least one
captured video clip is displayed in the capturing interface;
and in response to the triggering operation on any video clip
identification in the at least one video clip identification, the
preview interface is displayed, and the captured video clip
corresponding to the any video clip identification is dis-
played in the preview interface. In the embodiments of the
present disclosure, the captured video clip may be pre-
viewed in time in the segmented video capturing mode, so
that the user can judge whether the captured video clip meets
the capturing expectation in time, and thus the quality of
segmented video capturing is ensured.

What have been described above are only preferred
embodiments of the present disclosure and illustrations of
the technical principles employed. It will be appreciated by
those skilled in the art that the disclosure scope involved
herein is not limited to the technical solutions formed by
specific combinations of the above technical features, and
meanwhile should also include other technical solutions
formed by any combinations of the above technical features
or equivalent features thereof without departing from the
concept of the disclosure, for example, technical solutions
formed by mutual replacement of the above features with
technical features having similar functions disclosed in the
present disclosure (but is not limited to).

In addition, although various operations are depicted in a
particular order, this should not be understood as requiring
that these operations are performed in the particular order
shown or in a sequential order. In certain circumstances,
multitasking and parallel processing may be advantageous.
Similarly, although several specific implementation details
have been contained in the above discussion, these should not be construed as limiting the scope of the present disclo-
sure. Certain features that are described in the context of
separate embodiments may also be implemented in combi-
nation in a single embodiment. Conversely, various features
that are described in the context of a single embodiment may
also be implemented in a plurality of embodiments sepa-
rately or in any suitable sub-combination.

Although the present theme has been described in lan-
guage specific to structural features and/or methodological
actions, it should be understood that the theme defined in the
appended claims is not necessarily limited to the specific
features or actions described above. Rather, the specific
features and actions described above are merely example
forms of implementing the claims.

What is claimed is:

1. A video capturing method, comprising:
during a process of obtaining a target video in a seg-
mented capturing mode, in response to a capturing
pause operation, obtaining a captured video segment
corresponding to the target video;
displaying, in a capturing interface, a video segment
identification corresponding to the captured video seg-
ment;
in response to a triggering operation on the video segment
identification, displaying a preview interface and play-
ing the captured video segment corresponding to the
video segment identification in the preview interface;
and
determining a target capturing effect in response to a
capturing effect setting operation,
wherein determining the target capturing effect in
response to the capturing effect setting operation, com-
prises:
controlling, according to a sliding operation on a cap-
turing effect bar in the capturing interface, at least
one capturing effect icon of a plurality of capturing
effect icons in the capturing effect bar to pass through
a control region in response to the sliding operation;
and
determining a capturing effect corresponding to a captur-
ing effect icon of the plurality of capturing effect icons
that is currently located in the capturing control region
to be the target capturing effect in response to a sliding
stop operation on the capturing effect bar.

2. The method according to claim 1, further comprising:
deleting the captured video segment corresponding to the
video segment identification in response to a deleting
operation on the video segment identification.

3. The method according to claim 1, further comprising:
starting the capturing of the video segment by using the
target capturing effect in response to a capturing start
operation.

4. The method according to claim 1, wherein after deter-
mining the capturing effect corresponding to the icon of the
capturing effect that is currently located in the capturing
control region to be the target capturing effect, the method
further comprises:
displaying a capturing effect closing button at a preset
position around the capturing control, wherein the
capturing effect closing button is used for closing the
target capturing effect.

5. The method according to claim 4, wherein after dis-
playing the capturing effect closing button at the preset
position around the capturing control, the method further
comprises:
in response to a triggering operation on the capturing
effect closing button, closing the target capturing effect, and cancelling the display of the capturing effect closing button by moving, out of the capturing control region, the icon of the capturing effect that is currently located in the capturing control region.

6. The method according to claim 1, wherein before the capturing process, the method further comprises:

displaying the capturing interface in response to a triggering operation on a capturing entry, wherein a capturing association identification is displayed in the capturing interface, and the capturing association identification is horizontally arranged on the capturing interface to guide the user to switch to a horizontal-screen capturing mode.

7. The method according to claim 6, wherein the method further comprises:

in response to a triggering operation of switching the horizontal-screen capturing mode to a vertical-screen capturing mode, entering the vertical-screen capturing mode by rotating the capturing association identification by 90 degrees according to respective rotation centers.

8. The method according to claim 1, wherein the method further comprises:

in response to a start operation of a sight line correcting function, correcting the direction of the sight line in the captured video by running a preset sight line correction algorithm during the capturing process.

9. An electronic device, comprising: at least one processor and a memory, wherein the memory stores a computer executable instruction, the at least one processor executes the computer executable instruction stored in the memory, so that the at least one processor executes acts comprising:

during a process of obtaining a target video in a segmented capturing mode, in response to a capturing pause operation, obtaining a captured video segment corresponding to the target video;

displaying, in a capturing interface, a video segment identification corresponding to the captured video segment;

in response to a triggering operation on the video segment identification, displaying a preview interface and playing the captured video segment corresponding to the video segment identification in the preview interface; and determining a target capturing effect in response to a capturing effect setting operation, and determining the target capturing effect in response to the capturing effect setting operation comprises:

controlling, according to a sliding operation on a capturing effect bar in the capturing interface, capturing effect icon of a plurality of capturing effect icons in the capturing effect bar to pass through a control region in response to the sliding operation; and determining a capturing effect corresponding to a capturing effect icon of the plurality of capturing effect icons that is currently located in the capturing control region to be the target capturing effect in response to a sliding stop operation on the capturing effect bar.

10. The electronic device according to claim 9, the acts further comprising:

starting the capturing of the video segment by using the target capturing effect in response to a capturing start operation.

11. The electronic device according to claim 9, wherein after determining the capturing effect corresponding to the icon of the capturing effect that is currently located in the capturing control region to be the target capturing effect, the acts further comprise:

displaying a capturing effect closing button at a preset position around the capturing control, wherein the capturing effect closing button is used for closing the target capturing effect.

12. The electronic device according to claim 11, wherein after displaying the capturing effect closing button at the preset position around the capturing control, the acts further comprise:

in response to a triggering operation on the capturing effect closing button, closing the target capturing effect, and cancelling the display of the capturing effect closing button by moving, out of the capturing control region, the icon of the capturing effect that is currently located in the capturing control region.

13. The electronic device according to claim 9, wherein before the capturing process, the acts further comprise:

displaying the capturing interface in response to a triggering operation on a capturing entry, wherein a capturing association identification is displayed in the capturing interface, and the capturing association identification is horizontally arranged on the capturing interface to guide the user to switch to a horizontal-screen capturing mode.

14. A non-transitory computer-readable storage medium, wherein a computer executable instruction is stored in the computer-readable storage medium, and when executing the computer executable instruction, a processor executes acts comprising:

during a process of obtaining a target video in a segmented capturing mode, in response to a capturing pause operation, obtaining a captured video segment corresponding to the target video;

displaying, in a capturing interface, a video segment identification corresponding to the captured video segment;

in response to a triggering operation on the video segment identification, displaying a preview interface and playing the captured video segment corresponding to the video segment identification in the preview interface; and determining a target capturing effect in response to a capturing effect setting operation, wherein determining the target capturing effect in response to the capturing effect setting operation comprises:

controlling, according to a sliding operation on a capturing effect bar in the capturing interface, capturing effect icon of a plurality of capturing effect icons in the capturing effect bar to pass through a control region in response to the sliding operation; and determining a capturing effect corresponding to a capturing effect icon of the plurality of capturing effect icons that is currently located in the capturing control region to be the target capturing effect in response to a sliding stop operation on the capturing effect bar.

15. The non-transitory computer-readable storage medium according to claim 14, the acts further comprising:

starting the capturing of the video segment by using the target capturing effect in response to a capturing start operation.

16. The non-transitory computer-readable storage medium according to claim 15, wherein after determining the capturing effect corresponding to the icon of the capturing effect that is currently located in the capturing control region to be the target capturing effect, the acts further comprise:

displaying a capturing effect closing button at a preset position around the capturing control, wherein the capturing effect closing button is used for closing the target capturing effect.

17. The non-transitory computer-readable storage medium according to claim 16, wherein after displaying the capturing effect closing button at the preset position around the capturing control, the acts further comprise:

in response to a triggering operation on the capturing effect closing button, closing the target capturing effect, and cancelling the display of the capturing effect closing button by moving, out of the capturing control region, the icon of the capturing effect that is currently located in the capturing control region.

\* \* \* \* \*